Aug. 25, 1959 R. B. ATKINSON ET AL 2,901,309

RECORDER FOR PRODUCING FERROGRAPHIC IMAGES

Filed Jan. 3, 1955 2 Sheets-Sheet 1

INVENTORS
RALPH B. ATKINSON
STEVEN G. ELLIS
By Zulwider, Mattingly & Huntley
Attorneys

RECORDER FOR PRODUCING FERROGRAPHIC IMAGES

Filed Jan. 3, 1955 2 Sheets-Sheet 2

INVENTORS
RALPH B. ATKINSON
STEVEN G. ELLIS
BY Zulwider, Mattingly & Huntley
Attorneys United States Patent Office 2,901,309

Patented Aug. 25, 1959

2,901,309

RECORDER FOR PRODUCING FERROGRAPHIC IMAGES

Ralph B. Atkinson, Beverly Hills, and Steven G. Ellis, Van Nuys, Calif.; said Ellis assignor to said Atkinson Application January 3, 1955, Serial No. 479,486

19 Claims. (Cl. 346—74)

Our invention relates generally to image reproduction, and more particularly to recording apparatus for producing magnetic images by the system known generally as ferrography.

In previous patent applications we have disclosed a method of reproducing images magnetically, terming this method ferrography. In this system, an electrical signal is formed by scanning the image to be reproduced, the scanning preferably being done by a photocell in a series of parallel lines or sweeps. Simultaneously, a magnetizable member, preferably in the form of a sheet, is locally magnetized by some suitable form of recording head energized by the signal, the head travelling across the sheet in a series of parallel sweeps synchronized with those of the photocell, much as the electron beam sweeps across the face of a television picture tube. One such method of recording has been to wrap a piece of magnetizable material about a drum and to rotate the drum while a magnetic recording head slowly advances along the length of the drum. This produces very satisfactory results, but in many cases a continuous sheet or tape is desired, instead of a series of separate and individual sheets. Thus, in the facsimile transmission of news, drawings such as weather maps, etc., it is important to have a continuous sheet or tape form of reproduction, since the apparatus is frequently in continuous use, and a continuous sheet reduces the amount of attention that the recording apparatus must have.

It will be appreciated that in order to provide the necessary continuous type of operation, some device must be provided to make a series of transverse sweeps across the width of the magnetizable sheet. Thereafter, the magnetized sheet must be treated with a magnetic ink which will selectively adhere to the magnetized portions of the sheet, and be removed from the non-magnetized portions so that a visible indication of the invisible magnetic record is produced. The magnetizable sheet may then be used as the final record, or if desired, the information on it may be transferred by suitable transfer means to a final support which in turn becomes the final record.

It is therefore a major object of our invention to provide an improved recording apparatus for producing ferrographic images.

Another object of our invention is to provide such a device having the proper accuracy so that high resolution of images may be obtained.

It is a further object of our invention to provide such an apparatus that will reproduce images at a sufficiently high rate of speed so that information may be rapidly transmitted from one point to another.

Still another object of our invention is to provide recording apparatus of the class described adapted to receive a continuous roll of magnetizable sheet material of several hundred feet in length, should this be necessary, in order that operation of the machine may continue for an extended period of time without requiring attention on the part of the operator.

It is a still further object of our invention to provide such a machine that is comparatively simple in construction and ruggedly built, so that maintenance and service problems are reduced to a minimum.

An additional object of our invention is to provide a ferrographic recording apparatus of the class described in which the magnetizable sheet can be used to provide multiple copies by the addition of very simple auxiliary apparatus.

These and other objects and advantages of our invention will become apparent from the following description of a preferred form thereof, and from the drawings illustrating that form in which.

Figure 1:
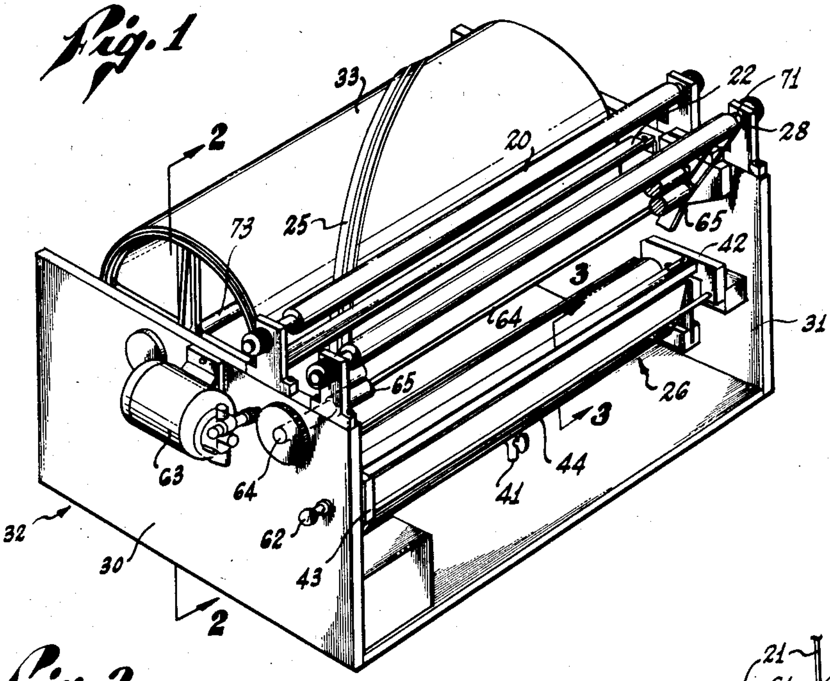
Figure 1 is a perspective view of our improved recording apparatus, with certain parts broken away to more clearly indicate the construction.

Referring now to the drawings for a brief description of the apparatus, it is to be understood that we provide a sheet of magnetizable material, generally similar to the so-called magnetic tape used in sound recording, and form on this tape a magnetic replica of an image to be reproduced. The replica is formed by locally magnetizing a small area of the magnetizable sheet, this being done by a suitable means such as a recording head of the general type used in magnetic tape sound recording. In effect, the head is moved across the sheet in a straight line, the intensity of magnetization varying in accordance with the electrical signal, and after one sweep or line is formed, a second line is then made parallel to the first line and immediately adjacent it. These lines combine to form a magnetic replica, in much the same way that the electron beam of a television picture tube sweeps across the face of that tube in a series of parallel lines that combine to form an image of the scene being viewed by the camera.

In the device shown in the present invention, a supply roll 20 feeds a continuous strip of the magnetizable sheet 21 past an erasing head 22 to remove any residual magnetism in the sheet. Thereafter, the sheet 21 passes across the recording means 23, including a recording bar 24 and a rotating helix 25. The sheet 21 then carries a magnetic replica of the original image, and to render this replica visible, the sheet is passed through a trough 26 containing an ink or pigment-like material having ferromagnetic properties, the ink being attracted to the magnetized portions of the sheet and being removed, as by gravity, from the non-magnetized portions.

After passing between drive rollers 27, the sheet 21 may then be rolled upon a takeup roller 28, or, if desired, passed through other appropriate means to effect a transfer of the pigment or ink to a different support.

Figure 2:
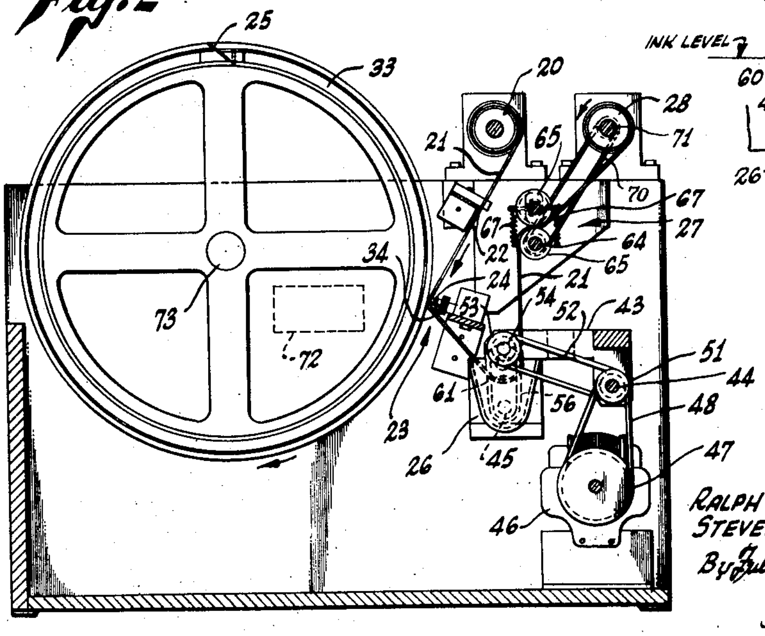
Figure 2 is a cross sectional view taken on the line 2—2 of Figure 1 and showing the path of the magnetizable sheet.

With this brief general description in mind, attention should now be directed to the particular apparatus illustrated in the figures. As seen in Figures 1 and 2, the supply roll 20 is mounted upon end members 30 and 31 of a support 32. Parallel to the axis of the supply roll 20 is a rotatable drum 33, rotatably supported by the end members 30 and 31.

Located upon the surface of the drum 33 is the helix 25 previously referred to, and adjacent the helix, in a position to be wiped by it, is the recording magnet 24, likewise supported by the end members 30 and 31, and extending across the entire width of the magnetic tape 21 in a direction substantially perpendicular to the longitudinal axis of the tape.

Assuming first that there is no magnetic tape 21 between the recording bar 24 and the helix 25, it will be realized that as the drum 33 rotates, the helix will contact a small area of the recording bar, which area will sweep across the bar from one end to the other. This area of contact between the recording bar 24 and the helix 25 is comparable to the spot formed on the viewing face of a television picture tube by the electron beam. Just as the spot is horizontally deflected across the face of the television picture tube to form a horizontal line, so the movement of the contact area from one end of the recording bar 24 to the other likewise can produce a line on the magnetic sheet 21.

Figure 6:
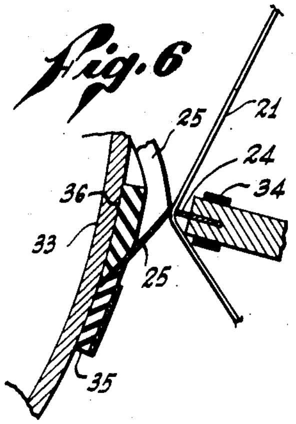
Figure 6 is an enlarged cross sectional view of a fragment of the drum and of the recording bar, showing the path of the magnetizable sheet and the positioning of the helix adjacent the recording bar.

During normal operation of the device, the magnetizable sheet or tape 21 is placed between the recording bar 24 and the helix 25 so that instead of making actual physical contact with the recording bar, the helix is spaced therefrom by the thickness of the magnetizable sheet. As previously mentioned, the recording bar 24 extends the entire width of the sheet 21, and the entire length of the bar is simultaneously magnetized by a coil 34 wound about the length of the bar, as best seen in Figure 6. While the entire length of the recording bar 24 is magnetized, and while the magnetic sheet 21 extends along the full length of that bar, the sheet will not be magnetized except where the bar and the helix 25 are aligned with each other. At all other points, the magnetic reluctance of the magnetic circuit is too great to provide any appreciable permanent magnetization of the magnetizable sheet 21.

As in the television picture, adjacent sweeps or lines should be as close together as possible so that the maximum resolution and quality can be obtained in the finished image. This means that as soon as the helix 25 has completed one sweep across the recording bar 24, the following sweep should immediately be started. During the time required for one sweep, the magnetizable sheet 21 will be advanced a distance equal to the spacing of the sweep, which, by way of example, may be between one-fortieth and one two-hundredths of an inch. A spacing of one-fortieth of an inch corresponds to forty lines per inch, which is somewhat coarser than half-tone engravings used in newspaper publishing. A spacing of one two-hundredths of an inch corresponds to two hundred lines per inch, which in turn corresponds to a fine half-tone engraving.

Assuming that there is a single helix 25 upon the drum 33, this helix making one complete revolution in its length along the drum, it can be seen that there must be one revolution of the drum 33 for each line formed upon the magnetizable sheet 21. Consequently, the drum 33 must proceed at a relatively high speed as compared with the advancement of the magnetic sheet 21, and normally it would be thought advisable to make the drum 33 of relatively small diameter. However, the smaller the diameter of the drum 33 with respect to its length, the more nearly parallel the helix 25 becomes with respect to the recording bar 24. Ideally, the helix 25 should be perpendicular to the recording bar 24 at their point of contact, since in this manner the maximum resolution of the finished image is secured. This results from the fact that the area of contact is a minimum under these conditions. Such a perpendicular arrangement is not generally practical, since, among other things, it would require that the helix 25 have a very large (theoretically an infinite) radius. Under such conditions, the peripheral speed of the drum 33 becomes excessive, and hence a compromise must be reached.

Figure 7:
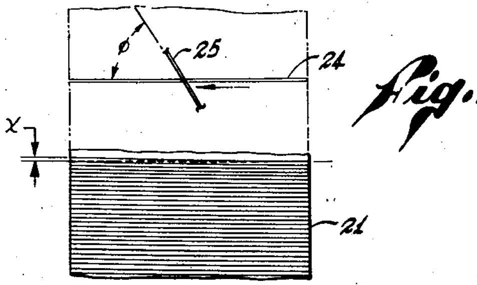
Figure 7 is a plan view of the magnetizable sheet, indicating the successive sweeps of the point of magnetization across the sheet, and indicating the angular contact that the helix makes with the recording bar.
Figure 8:
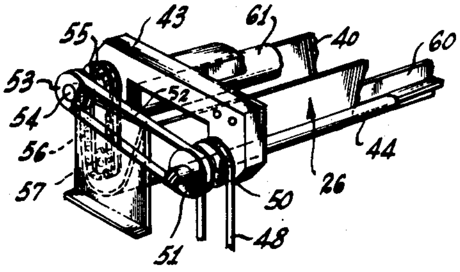
Figure 8 is an enlarged fragmentary view in perspective of the ink trough with the associated roller for carrying the sheet into the inking solution, and indicating the method of support for that roller.

In Figure 7 there is illustrated a portion of the magnetizable sheet 21 with the successive scans or lines indicated thereon, as well as the position of the recording bar 24 and the helix 25 as these appear when viewing the surface of the sheet carrying the magnetic coating. It will be noted that in this figure the angle that the helix 25 makes with the recording bar 24 is designated by the letter $\phi$, and it has been found that for values of $\phi$ less than fifty degrees, frequency response and consequently resolution are adversely affected. We have found that for most purposes, the angle should have a value of approximately sixty degrees.

Figure 5:
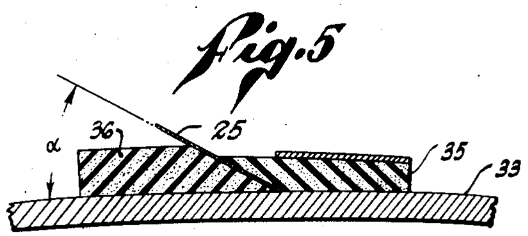
Figure 5 is an enlarged fragmentary sectional view taken on the line 5—5 of Figure 4 and showing the positioning and mounting of the helix.
Figure 9:
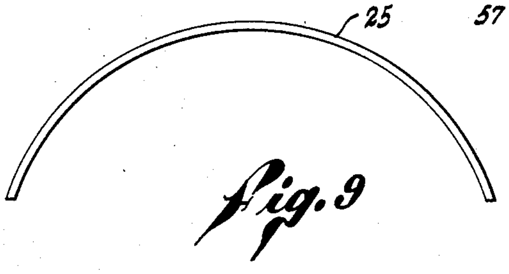
Figure 9 is a plan view of the helix before it has been formed into its helical shape, as it appears when it has been cut from the flat sheet of metal.

In order to reduce the magnetic reluctance of the magnetic circuit between the recording bar 24 and the helix 25, and also to produce the sharpness and resolution desirable in the finished image, the helix 25 should press firmly against the magnetic tape or sheet 21 as the latter passes over the recording bar. On the other hand, too great a pressure will cause excessive wear and may scratch or even tear the magnetic sheet 21. A resilient mounting of one of the recording members, either the recording bar 24 or the helix 25 is thus indicated, and to insure the production of straight parallel lines, it is the helix that should be resiliently mounted, rather than the recording bar. We have found that if the helix 25 projects radially from the drum 33, thereby forming a surface known as a helicoid, and if it is resiliently mounted for radially inward movement, the material forming the helicoid is usually of such stiffness as to prevent the desired resilient action. On the other hand, if the helix 25 makes an acute angle with the surface of the drum 33, thereby forming an oblique helicoid, satisfactory results are obtained since in addition to the resilient mounting, the helicoid itself can be resiliently flexed to provide the necessary resilience. Once again the angle can be varied between limits, and in Figure 5, we have shown the helix or helicoid 25 mounted upon the surface of the drum 33 to form an angle $\alpha$ therebetween. We have found that where the angle $\alpha$ is thirty degrees, very satisfactory results are obtained. To provide the desired resilient support for the helix 25 as well as to hold it at the proper angle with respect to the surface of the drum 33, strips 35 and 36 are cemented or otherwise held to the surface of the drum, the adjacent surfaces of the strips being formed at the desired angle, and the helix or helicoid 25 being placed between them. In this manner, a very satisfactory support for the helix 25 is provided, and abrasion and wear of the helix is reduced to a minimum. By way of example only, and not as a limitation, it has been found that the helicoid may be formed of shim steel approximately .003 inch thick, and approximately three-quarter inches wide. The material may be cut from flat stock into the shape shown in Figure 9. When a recording 18.85 inches wide is to be made, a drum of approximately 10 inches in diameter is required, and when the helicoid 25 is mounted as shown in Figure 5, this provides an angle $\phi$ of approximately 60 degrees.

Like the helicoid 25, the recording bar 24 may be made of shim steel, and will normally be of a thickness commensurate with the number of lines per inch that are to be recorded upon the magnetic sheet 21. Thus, if ninety six lines per inch are to be recorded, a recording bar 24 having a thickness of .009 inch will meet the requirements, but under certain conditions, as where it may be desirable to see a slight space between the adjacent lines, a bar of .008 inch thickness may be used. In both the case of the recording bar 24 and the helix 25, it would be better from the standpoint of design of the magnetic circuit to use materials of high permeability, such as some of the special alloys available under various trade names, and grain oriented sheet steel, but when these are not available in the required sizes, the shim steel previously mentioned may be used.

It is possible to locate the magnetic sheet 21 so that the magnetic coating thereon is adjacent the helix 25 or adjacent the recording bar 24. We have found that we are able to produce better recording results when the magnetic tape 21 has its magnetizable surface against the helix 25, which may be considered the induced pole of a magnetic gap, than when the tape has that surface adjacent the recording bar 24. Consequently, in the form of device shown in Figure 2, the supply roll 20 of magnetizable sheet 21 is wound so that the magnetic surface of that sheet is wound inwardly on the roll. When removed from the roll, the sheet passes over the erase bar 22, which is generally similar to the recording bar 24, with the important difference that the erase bar is energized with a substantially constant frequency signal so that as it leaves the bar, the sheet 21 is in its neutral or demagnetized condition. The operation of such erasing devices is well known, and need not be further described herein. It should be noted, however, that the erase bar 22 extends the full width of the tape 21 so that the entire width of the tape is demagnetized before any record is placed upon it.

Figure 3:
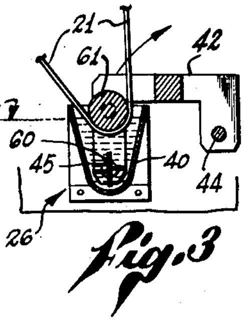
Figure 3 is a fragmentary view taken on the line 3—3 of Figure 1 and showing the construction and operation of the ink trough through which the sheet passes.
Figure 4:
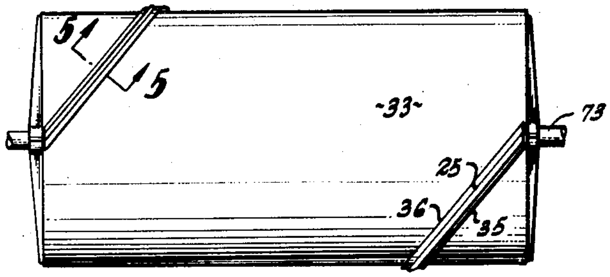
Figure 4 is a plan view of the drum carrying the helix, across which the magnetizable sheet passes.

After the demagnetized sheet 21 has passed between the recording bar 24 and the helix 25 to have a magnetic replica formed thereon, the sheet passes through the inking trough indicated in Figure 3.

As seen in Figures 1 and 3, the ink trough 26 consists of a generally channel shaped member 40 preferably having downwardly converging sides that are joined at the bottom by an arcuate section, the trough extending substantially the full length between the end members 30 and 31. For convenience, a drain cock 41 may be provided to remove the ink from the trough when the machine is to be taken out of operation.

Immediately above the channel member 40 are a pair of arms 42 and 43 that are pivotally attached to the end members 30 and 31 at points to one side of the channel member, on the opposite side thereof from the drum 33. A shaft 44 extends between the end members 30 and 31, forming the point of pivotal attachment for the arms 42 and 43, and as best seen in Figure 3, the arms are generally U-shaped, with the legs of the U projecting vertically downwardly from the horizontal base extending above the top of the channel member 40. As seen in Figure 3, one leg of the U has the shaft 44 located at its lower end, and the other leg of the U, in normal operating position, extends down into the trough 40 and carries a rotatable shaft 45 thereon. The leg of the U that carries the rotatable shaft 45 is somewhat longer than the leg carrying the shaft 44, and the generally tapered cross section of the channel member 40 makes it possible for the arms 42 and 43 to be pivoted about the shaft 44 to remove the longer arms and the shaft 45 carried thereby from the channel member.

The ink or pigment-like material carried by the channel member 40 has a tendency to have certain portions of the ink settle, and consequently a certain amount of agitation of the ink is desirable in order that the ink may be uniformly mixed. We accomplish this mixing by providing a small motor 46 mounted upon the end member 30 and having a pulley 47 thereon adapted to drive a belt 48. Mounted upon the shaft 44 are a pair of pulleys 50 and 51 that are joined together to rotate as a unit, but which may rotate with respect to the shaft 44 and also with respect to the arms 42 and 43. The pulley 50 is driven by the belt 48, and the pulley 51 in turn drives a belt 52 which extends in a direction generally parallel to the base of the U to engage and drive a pulley 53 mounted upon a shaft 54 located near the junction of the base and longer leg of the U. A sprocket 55 is also mounted upon the shaft 54 and is driven by the pulley 53, and a chain 56 connects the sprocket 55 to a similar sprocket 57 mounted upon the end of the shaft 45 in the lowermost end of the longer arm of the U.

Longitudinally extending blades 60 are mounted upon the shaft 45, and as the shaft is rotated, the blades turn and agitate the ink so that a uniform mixture is provided. In this way, consistent and satisfactory results can be obtained, and the arms 42 and 43 may be pivoted about the shaft 44 without in any way affecting the driving connection between the motor 46 and the agitator blades 60. It will be appreciated, of course, that instead of using belt and pulley connections between the motor 46 and the shaft 54, sprockets and chains may be used instead, as may gears and other similar drives. Furthermore, while the chain 56 and its associated sprockets 55 and 57 will normally be within the space between the ends of the channel 40, the pulley 53 or its equivalent, is preferably located outside the trough so that any ink that is carried by the chain 56 will be less likely to get to the pulley 53.

It will be recalled that after the magnetic sheet 21 leaves the recording means 23, it passes through the ink trough 26 and then upwardly to the drive roller 27. To insure that the sheet 21 is properly immersed in the ink within the trough 26, and then passes upwardly in the desired direction, a roller 61 is mounted on the longer legs of the U-shaped arms 42 and 43, the axis of the roller being parallel to that of the drum 33 and the axis of the shaft 44. The lower surface of the roller 61 is located below the normal surface of the ink within the trough 26, and is spaced a slight distance above the uppermost limit of travel of the blades 60. By passing the magnetic sheet 21 under the roller 61, the proper immersion of the sheet is insured. Any tension applied to the sheet is prevented from lifting the arms 42 and 43 by means of a suitable lock, such as an inwardly urged resiliently mounted pin 62 that extends through one end member 30 to engage the arm 43 and prevent the pivoting of the latter about the shaft 44.

The drive rollers 27, located above the ink trough 26, are preferably driven by a separate motor 63 mounted upon one of the end members such as 30, and suitably geared to drive a shaft 64 at the proper speed. The shaft 64 carries suitable means engaging the magnetic tape 21, such means being, for example, a resilient roller 65 that may extend the full width of the magnetic sheet 21. Alternatively, the roller 65 may be formed of two short sections mounted on opposite ends of the shaft 64 and engaging only the sides of the magnetic sheet 21, or if desired, a sprocket drive may be used to engage perforations along the edges of the sheet. In any event, the sheet 21 is preferably held against the roller 65 or its equivalent by a resiliently urged roller 66 that is suitably biased, as by springs 67, against the drive roller 65.

From the shaft 64 a belt 70 extends generally upwardly to drive a shaft 71 carrying the take-up roll 28, this drive being slippable to permit the necessary variations in speed as the diameter of the take-up roll changes as more or less magnetic sheet is wound thereon.

To complete the device, a motor 72 is mounted upon one of the end members, such as 31, and is connected through suitable gear means to the shaft 73 upon which the drum 33 is mounted. It will be appreciated that the speed of the drum 33 must be correlated with the speed of the driving roller 65, and consequently we prefer to use synchronous motors with the proper gear reductions so that both members are driven and maintained in the proper speed relationship. The motor 46 drives the agitator blades 60, and as the speed of this is not critical, it is not necessary to use a synchronous motor for this particular function. While the motors 63 and 72 might be combined in a single motor with appropriate gear connections between the shafts 73 and 64, the larger motor must have adequate power, and the gear connections must be sufficiently accurate to produce satisfactory results. The motor 46 will preferably be a separate and independent motor, since it is often desirable to start the agitation of the ink prior to the actual operation of the recording device.

From the foregoing, it will be seen that we have provided a recording device of the class described fully capable of securing the advantages and achieving the objects heretofore set forth. It will be appreciated that many changes may be made in the device, depending upon the use to which the machine is to be put. For example, instead of using a single helix or helicoid 25, a plurality of helical strips may be placed upon the surface of the drum 33 so that a plurality of sweeps across the recording bar 24 are obtained with a single revolution of the drum. The desirability of such a construction will be determined by many various factors, including the necessary peripheral speed of the drum, since centrifugal force soon becomes an important factor.

Likewise, the resilient mounting of the helix is an important feature of our invention, but the particular angle used may be changed as well as may be particular mounting materials. Consequently, while we have shown and described a preferred form of our invention, we do not wish to be restricted to the particular form or arrangement of parts herein described and shown, except as limited by our claims.

We claim:

1. A device of the type described for the magnetic recording of images, which includes: means for supplying a sheet of magnetizable record material; a recording bar of high permeability and of a size to extend across one dimension of said sheet; coil means for variably magnetizing said recording bar a rotatable drum adjacent said recording bar; a helicoid of high permeability resiliently mounted upon said drum, making an acute angle with the surface of said drum, said helicoid being rotatable with said drum about the axis of said helicoid, and being adapted to make a resilient wiping contact with said bar to wipe thereacross, and being formed so that said wiping contact is in the general direction from the base of said helicoid toward the tip thereof; guiding means adapted to advance said sheet between said bar and said helicoid in a direction generally perpendicular to said bar and while said helicoid is rotating the combined resiliencies of said helicoid produced by its acute-angle mounting and its resilient mounting providing proper pressure on said sheet of record material; and driving means connected to said helicoid and to said guiding means and acting to rotate said helicoid at a speed having a predetermined correlation with the rate of advance of said sheet.

2. A device of the type described for the magnetic recording of images, which includes: means for supplying a sheet of magnetizable record material; a recording bar of high permeability and of a size to extend across one dimension of said sheet; coil means for variably magnetizing said recording bar; a rotatable drum adjacent said recording bar; a helicoid of high permeability sheet-like material rotatable about its axis and adapted to make a resilient wiping contact with said bar to wipe across said bar from one end thereof to the other; resilient means mounting said helicoid upon said drum in such a manner that flexure of said helicoid is restrained by said resilient mounting means said resiliently mounted helicoid forming an acute angle with the surface of said drum; guiding means adapted to advance said sheet between said bar and said helicoid in a direction generally perpendicular to said bar and while said helicoid is rotating the combined resiliencies of said helicoid produced by its acute-angle mounting and its resilient mounting providing proper pressure on said sheet of record material; and driving means connected to said helicoid and to said guiding means and acting to rotate said helicoid at a speed having a predetermined correlation with the rate of advance of said sheet.

3. A device of the type described for the magnetic recording of images, which includes: means for supplying a sheet of magnetizable record material; a recording bar of high permeability and of a size to extend across one dimension of said sheet; coil means for variably magnetizing said bar along the entire length; a rotatable drum adjacent said recording bar; an oblique helicoid of high permeability sheet-like material mounted upon said drum and rotatable therewith about the axis of said helicoid, said helicoid being adapted to make a resilient wiping contact with said bar to wipe thereacross, and being formed so that said wiping contact is in the general direction from the base of said helicoid toward the tip thereof; resilient means mounting said oblique helicoid upon said drum in such a manner that flexure of said helicoid is restrained by said resilient mounting means; guiding means adapted to advance said sheet between said bar and said helicoid in a direction generally perpendicular to said bar and while said helicoid is rotating the combined resiliencies of said helicoid produced by its oblique and resilient mounting providing proper pressure on said sheet of record material; and driving means connected to said helicoid and to said guiding means and acting to rotate said helicoid at a speed having a predetermined correlation with the rate of advance of said sheet.

4. A device of the type described for the magnetic recording of images, which includes: means for supplying a sheet of magnetizable record material; a recording bar of high permeability and of a size to extend across one dimension of said sheet; coil means for variably magnetizing said bar; a helicoid of high permeability rotatable about its axis and adapted to make a resilient wiping contact with said bar to wipe across it from one end to the other, said bar and the wiping edge of said helicoid making an angle of more than 50 degrees; guiding means adapted to advance said sheet between said bar and said helicoid in a direction generally perpendicular to said bar and while said helicoid is rotating; and driving means connected to said helicoid and to said guiding means and acting to rotate said helicoid at a speed having a predetermined correlation with the rate of advance of said sheet.

5. A device of the type described for the magnetic recording of images, which includes: means for supplying a sheet of magnetizable record material; a recording bar of high permeability and of a size to extend across one dimension of said sheet; coil means for variably magnetizing said bar; a rotatable drum adjacent said recording bar; a helicoid of high permeability sheet-like material mounted upon said drum and making an angle of less than 60 degrees with the surface of said drum, said helicoid being rotatable about its axis and being adapted to make a resilient wiping contact with said bar to wipe thereacross; guiding means adapted to advance said sheet between said bar and said helicoid in a direction generally perpendicular to said bar and while said helicoid is rotating; and driving means connected to said helicoid and to said guiding means and acting to rotate said helicoid at a speed having a predetermined correlation with the rate of advance of said sheet.

6. A device of the type described for the magnetic recording of images, which includes: means for supplying a sheet of magnetizable record material; a recording bar of high permeability and of a size to extend across one dimension of said sheet; coil means for variably magnetizing said bar; a rotatable drum adjacent said recording bar; a helicoid of high permeability sheet-like material mounted upon said drum and making an angle of less than 60 degrees with the surface thereof, said helicoid being rotatable about its axis and being adapted to make a resilient wiping contact with said bar to wipe thereacross, said bar and the wiping edge of said helicoid making an angle of more than 50 degrees; guiding means adapted to advance said sheet between said bar and said helicoid in a direction generally perpendicular to said bar and while said helicoid is rotating; and driving means connected to said helicoid and to said guiding means and acting to rotate said helicoid at a speed having a predetermined correlation with the rate of advance of said sheet.

7. A device of the type described for recording images, which includes: means for supplying a sheet of record material; a recording bar of a size to extend across one dimension of said sheet, the entire length of said bar being energized; a rotatable drum adjacent said recording bar; a helicoid of sheet-like material mounted upon said drum and making an angle of less than 60 degrees with the surface thereof, said helcoid being rotatable about its axis and being adapted to make a resilient wiping contact with said bar to wipe thereacross, said bar and the wiping edge of said helicoid making an angle of more than 50 degrees; resilient means mounting said helicoid upon said drum in such a manner that flexure of said helicoid is restrained by said resilient mounting means; guiding means adapted to advance said sheet between said bar and said helicoid in a direction generally perpendicular to said bar and while said helicoid is rotating; and driving means connected to said helicoid and to said guiding means and acting to rotate said helicoid at a speed having a predetermined correlation with the rate of advance of said sheet.

8. A device of the type described for the magnetic recording of images, which includes: means for supplying a sheet of magnetizable record material; a recording bar of high permeability and of a size to extend across one dimension of said sheet; coil means for variably magnetizing said bar; a helicoid of high permeability rotatable about its axis and adapted to make a resilient wiping contact with said bar to wipe across it from one end to the other, said bar and the wiping edge of said helicoid making an angle of approximately 60 degrees; guiding means adapted to advance said sheet between said bar and said helicoid in a direction generally perpendicular to said bar and while said helicoid is rotating; and driving means connected to said helicoid and to said guiding means and acting to rotate said helicoid at a speed having a predetermined correlation with the rate of advance of said sheet.

9. A device of the type described for the magnetic recording of images, which includes: means for supplying a sheet of magnetizable record material; a recording bar of high permeability and of a size to extend across one dimension of said sheet; coil means for variably magnetizing said bar; a rotatable drum adjacent said recording bar; a helicoid of high permeability sheet-like material mounted upon said drum and making an angle of approximately 30 degrees with the surface of said drum, said helicoid being rotatable about its axis and being adapted to make a resilient wiping contact with said bar to wipe thereacross; guiding means adapted to advance said sheet between said bar and said helicoid in a direction generally perpendicular to said bar and while said helicoid is rotating; and driving means connected to said helicoid and to said guiding means and acting to rotate said helicoid at a speed having a predetermined correlation with the rate of advance of said sheet.

10. A device of the type described for the magnetic recording of images, which includes: means for supplying a sheet of magnetizable record material; a recording bar of high permeability and of a size to extend across one dimension of said sheet; coil means for variably magnetizing said bar; a rotatable drum adjacent said recording bar; a helicoid of high permeability sheet-like material mounted upon said drum and making an angle of approximately 30 degrees with the surface thereof, said helicoid being rotatable about its axis and being adapted to make a resilient wiping contact with said bar to wipe thereacross, said bar and the wiping edge of said helicoid making an angle of approximately 60 degrees; guiding means adapted to advance said sheet between said bar and said helicoid in a direction generally perpendicular to said bar and while said helicoid is rotating; and driving means connected to said helicoid and to said guiding means and acting to rotate said helicoid at a speed having a predetermined correlation with the rate of advance of said sheet.

11. A device of the type described for recording images, which includes: means for supplying a sheet of record material; a recording bar of a size to extend across one dimension of said sheet, the entire length of said bar being energized; a rotatable drum adjacent said recording bar; a helicoid of sheet-like material mounted upon said drum and making an angle of approximately 30 degrees with the surface thereof, said helicoid being rotatable about its axis and being adapted to make a resilient wiping contact with said bar to wipe thereacross, said bar and the wiping edge of said helicoid making an angle of approximately 60 degrees; resilient means mounting said helicoid upon said drum in such a manner that flexure of said helicoid is restrained by said resilient mounting means; guiding means adapted to advance said sheet between said bar and said helicoid in a direction generally perpendicular to said bar and while said helicoid is rotating; and driving means connected to said helicoid and to said guiding means and acting to rotate said helicoid at a speed having a predetermined correlation with the rate of advance of said sheet.

12. A device of the type described for the magnetic recording of images, which includes: means for supplying a sheet of record material; a recording bar of a size to extend across one dimension of said sheet; a helicoid rotatable about its axis and adapted to make a resilient wiping contact with said bar to wipe across it from one end to the other, said bar and the wiping edge of said helicoid making an angle of more than 50 degrees; guiding means adapted to advance said sheet between said bar and said helicoid in a direction generally perpendicular to said bar and while said helicoid is rotating; and driving means connected to said helicoid and to said guiding means and acting to rotate said helicoid at a speed having a predetermined correlation with the rate of advance of said sheet.

13. A device of the type described for magnetically recording images, which includes: means for supplying a sheet of magnetizable record material; a recording bar of a size to extend across one dimension of said sheet, the entire length of said bar being energized; a rotatable drum adjacent said recording bar; a helicoid mounted upon said drum and rotatable about the axis of said helicoid, said helicoid being adapted to make a resilient wiping contact with said bar to wipe across said bar from one end thereof to the other; guiding means adapted to advance said sheet between said bar and said helicoid in a direction generally perpendicular to said bar and while said helicoid is rotating; driving means connected to said helicoid and to said guiding means and acting to rotate said helicoid at a speed having a predetermined correlation with the rate of advance of said sheet; and means for inking the magnetized portions of said sheet of magnetizable recording material to render the magnetized portions visible.

14. A device of the type described for the magnetic recording of images, which includes: means for supplying a sheet of magnetizable record material; a recording bar of high permeability and of a size to extend across one dimension of said sheet; coil means for variably magnetizing said recording bar; a rotatable drum adjacent said recording bar; an oblique helicoid of high permeability mounted upon said drum and rotatable therewith about the axis of said helicoid, said helicoid being adapted to make a resilient wiping contact with said bar to wipe thereacross, and being formed so that said wiping contact is in the general direction from the base of said helicoid toward to tip thereof; guiding means adapted to advance said sheet between said bar and said helicoid in a direction generally perpendicular to said bar and while said helicoid is rotating; driving means connected to said helicoid and to said guiding means and acting to rotate said helicoid at a speed having a predetermined correlation with the rate of advance of said sheet; and means for contacting ferromagnetic inking material with said sheet of record material whereby to render the magnetizable portions of said record material visible.

15. A device of the type described for the magnetic recording of images, which includes: means for supplying a sheet of magnetizable record material; a recording bar of high permeability and of a size to extend across one dimension of said sheet; coil means for variably magnetizing said bar along the entire length; a rotatable drum adjacent said recording bar; an oblique helicoid of high permeability sheet-like material mounted upon said drum and rotatable therewith about the axis of said helicoid, said helicoid being adapted to make a resilient wiping contact with said bar to wipe thereacross, and being formed so that said wiping contact is in the general direction from the base of said helicoid toward the tip thereof; resilient means mounting said helicoid upon said drum in such a manner that flexure of said helicoid is restrained by said resilient mounting means; guiding means adapted to advance said sheet between said bar and said helicoid in a direction generally perpendicular to said bar and while said helicoid is rotating; driving means connected to said helicoid and to said guiding means and acting to rotate said helicoid at a speed having a predetermined correlation with the rate of advance of said sheet; and means for inking the magnetized portions of said sheet of magnetizable recording material to render the magnetized portions visible.

16. A device of the type described for the magnetic recording of images, which includes: means for supplying a sheet of magnetizable record material; a recording bar of high permeability and of a size to extend across one dimension of said sheet; coil means for variably magnetizing said bar; a helicoid of high permeability rotatable about its axis and adapted to make a resilient wiping contact with said bar to wipe across it from one end to the other, said bar and the wiping edge of said helicoid making an angle of more than 50 degrees; guiding means adapted to advance said sheet between said bar and said helicoid in a direction generally perpendicular to said bar and while said helicoid is rotating; driving means connected to said helicoid and to said guiding means and acting to rotate said helicoid at a speed having a predetermined correlation with the rate of advance of said sheet; and means for coloring the magnetized portions of said sheet of magnetizable recording material to render the magnetized portions visible.

17. A device of the type described for the magnetic recording of images, which includes: means for supplying a sheet of magnetizable record material; a recording bar of high permeability and of a size to extend across one dimension of said sheet; coil means for variably magnetizing said bar; a rotatable drum adjacent said recording bar; a helicoid of high permeability sheet-like material mounted upon said drum and making an angle of less than 60 degrees with the surface of said drum, said helicoid being rotatable about its axis and being adapted to make a resilient wiping contact with said bar to wipe thereacross; guiding means adapted to advance said sheet between said bar and said helicoid in a direction generally perpendicular to said bar and while said helicoid is rotating; driving means connected to said helicoid and to said guiding means and acting to rotate said helicoid at a speed having a predetermined correlation with the rate of advance of said sheet; and means for coloring the magnetized portions of said sheet of magnetizable recording material to render the magnetized portions visible.

18. A device of the type described for the magnetic recording of images, which includes: means for supplying a sheet of magnetizable record material; a recording bar of high permeability and of a size to extend across one dimension of said sheet; a coil means for variably magnetizing said bar; a rotatable drum adjacent said recording bar; a helicoid of high permeability sheet-like material mounted upon said drum and making an angle of less than 60 degrees with the surface thereof, said helicoid being rotatable about its axis and being adapted to make a resilient wiping contact with said bar to wipe thereacross, said bar and the wiping edge of said helicoid making an angle of more than 50 degrees; guiding means adapted to advance said sheet between said bar and said helicoid in a direction generally perpendicular to said bar and while said helicoid is rotating; driving means connected to said helicoid and to said guiding means and acting to rotate said helicoid at a speed having a predetermined correlation with the rate of advance of said sheet; and means for contacting ferromagnetic inking material with said sheet of record material whereby to render the magnetizable portions of said record material visible.

19. A device of the type described for recording images, which includes: means for supplying a sheet of magnetizable record material; a recording bar of a size to extend across one dimension of said sheet, the entire length of said bar being energized; a rotatable drum adjacent said recording bar; a helicoid of sheet-like material mounted upon said drum and making an angle of less than 60 degrees with the surface thereof, said helicoid being rotatable about its axis and being adapted to make a resilient wiping contact with said bar to wipe thereacross, said bar and the wiping edge of said helicoid making an angle of more than 50 degrees; resilient means mounting said helicoid upon said drum in such a manner that flexure of said helicoid is restrained by said resilient mounting means; guiding means adapted to advance said sheet between said bar and said helicoid in a direction generally perpendicular to said bar and while said helicoid is rotating; driving means connected to said helicoid and to said guiding means and acting to rotate said helicoid at a speed having a predetermined correlation with the rate of advance of said sheet; and means for contacting ferromagnetic inking material with said sheet of record material whereby to render the magnetizable portions of said record material visible.

References Cited in the file of this patent

UNITED STATES PATENTS

| | | |
|---|---|---|
| 2,188,650 | Clark | Jan. 30, 1940 |
| 2,621,999 | Alden | Dec. 16, 1952 |
| 2,677,728 | Kolb et al. | May 4, 1954 |
| 2,704,700 | Hahn | Mar. 22, 1955 |
| 2,717,191 | Hester | Sept. 6, 1955 |
| 2,771,505 | Avery et al. | Nov. 20, 1956 |